(No Model.) 3 Sheets—Sheet 1.
F. W. HAVILAND.
VEHICLE DRIVING GEAR.
No. 570,396. Patented Oct. 27, 1896.
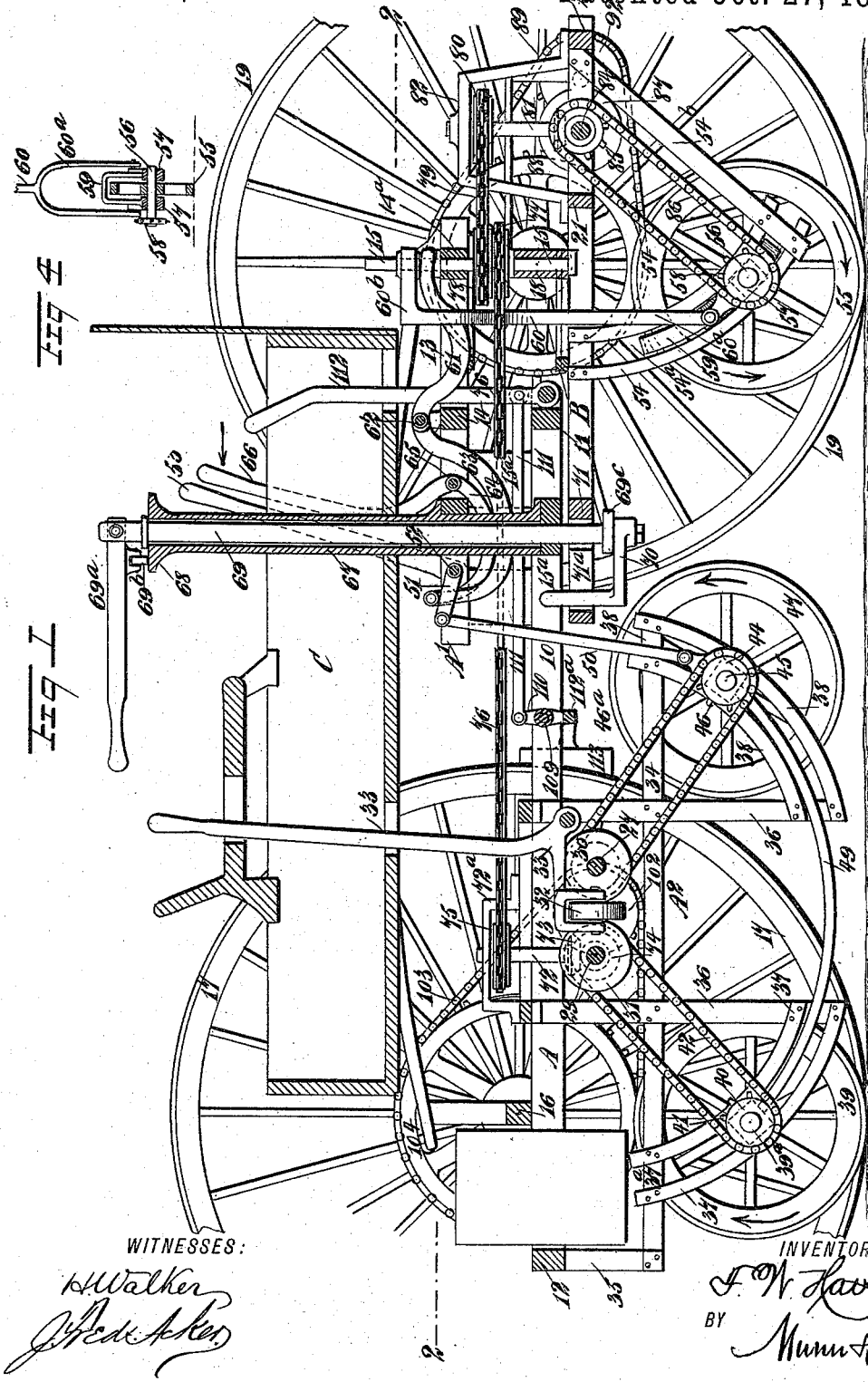
WITNESSES:
H. Walker
J. Fred Acker
INVENTOR
F. W. Haviland
BY
Munn & Co
ATTORNEYS.

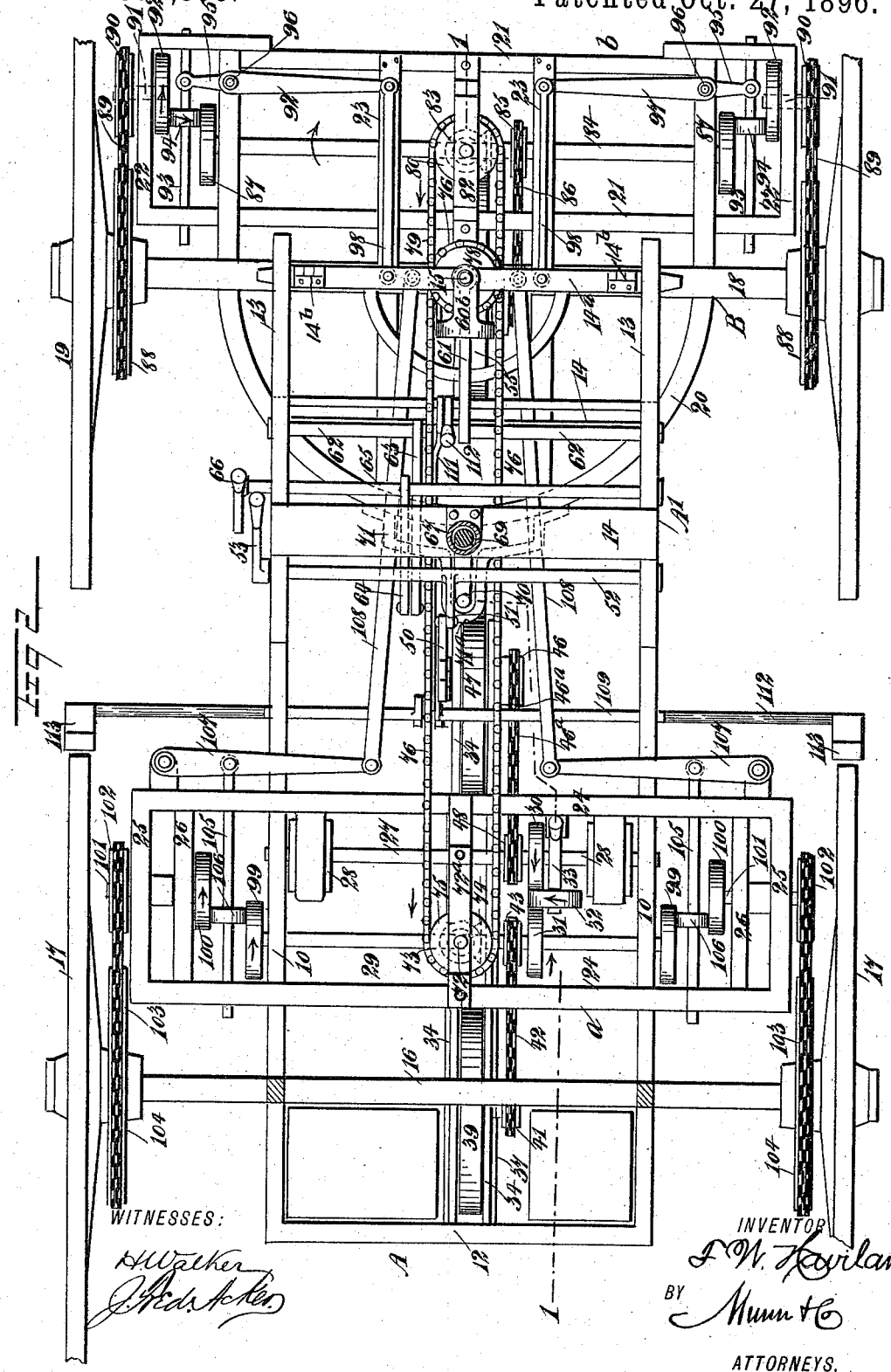

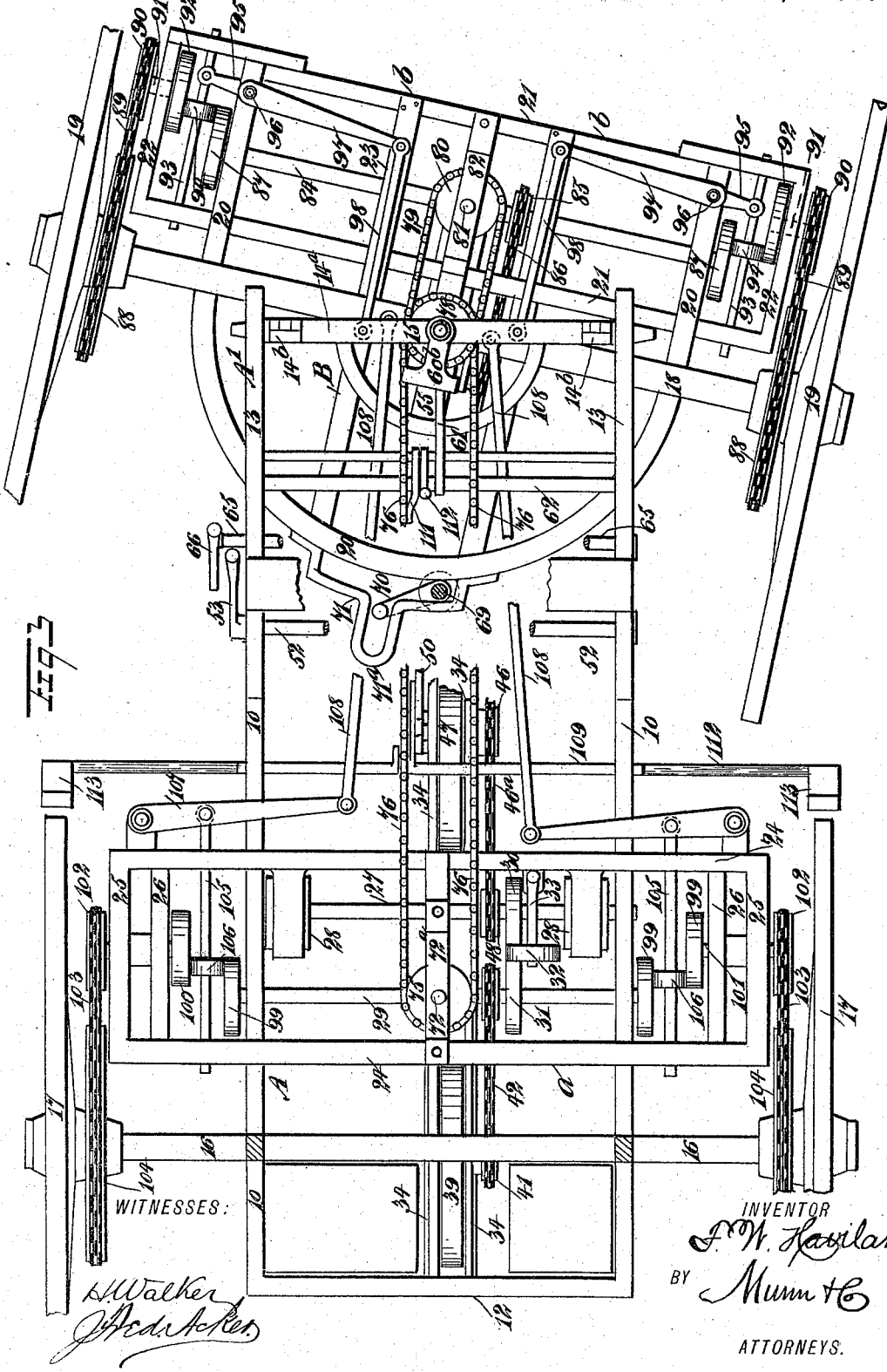

UNITED STATES PATENT OFFICE.

FRANK W. HAVILAND, OF NEW YORK, N. Y.

VEHICLE DRIVING-GEAR.

SPECIFICATION forming part of Letters Patent No. 570,396, dated October 27, 1896.

Application filed December 4, 1895. Serial No. 571,045. (No model.)

*To all whom it may concern:*

Be it known that I, FRANK W. HAVILAND, of New York city, in the county and State of New York, have invented a new and Improved Vehicle Driving-Gear, of which the following is a full, clear, and exact description.

The general object of the invention is to provide a driving-gear which will be arranged to drive the vehicle independent of its running or supporting wheels and at the same time prevent any slip and consequently prevent loss of the power applied.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a longitudinal vertical section through the vehicle, the said section being taken substantially on the line 1 1 of Fig. 2. Fig. 2 is a plan view of the running-gear of the vehicle, the body being removed and the steering-lever and its guide being shown in horizontal section, the said section being taken substantially on the line 2 2 of Fig. 1. Fig. 3 is a view similar to Fig. 1, parts being broken away, however, the said Fig. 3 illustrating the running-gear in cramped form or in position to turn a corner; and Fig. 4 is a detail sectional view of a connection with the forward propelling-wheel.

In carrying out the invention a frame A is provided for the rear portion of the running-gear, and this frame preferably consists of parallel side bars 10, a front bar 11, and a rear bar 12. The forward portion of the frame A may be said to constitute a portion of the reach of the running-gear, the reach being completed by the addition of a second frame A', placed above the forward end of the rear frame A, being carried forwardly beyond the rear frame, and the reach-frame A' comprises parallel side bars 13, cross-bars 14 near its rear end and intermediate of its ends, and a forward cross-bar 14ª, the latter being apertured to receive the king-bolt 15, and the reach-frame is positively connected to the rear frame by pedestals 15ª, as shown in Fig. 1.

The rear axle 16 is secured in any suitable or approved manner to the rear portion of the rear frame A, and is provided with running or supporting wheels 17, loosely mounted at its ends. The forward axle 18 is apertured to receive the king-bolt in the usual way, and likewise carries at each of its ends a loosely-mounted running or supporting wheel 19. The forward axle forms a portion of the truck B, and this truck comprises preferably a rearward hound 20 and a transverse frame *b*, to which the members of the hound are attached, and the said truck-frame *b*, as shown in Figs. 2 and 3, comprises parallel front and rear bars 21 and end bars 22, together with intermediate cross-bars 23; and a similar frame *a* is secured upon the upper portion of the rear main frame A forward of the rear axle, and this rear auxiliary frame *a* preferably comprises front and rear bars 24, end bars 25, and intermediate cross-bars 26.

Preferably below the rear auxiliary frame *a* a power-shaft 27 is journaled in the main frame A, and the said shaft is rotated through the medium of one or more motors 28, of any approved construction. A driving-shaft 29 is located at the rear of the power-shaft, being preferably parallel therewith, and the power-shaft is provided near one of its ends with a friction-wheel 30, a corresponding and alining wheel 31 being secured on the drive-shaft, and the motion is imparted to the wheel 31 through the wheel 30 by interposing between these two wheels a third friction-wheel 32, being in engagement with the peripheries of the two wheels 30 and 31, as shown in Figs. 1 and 2, and the smaller friction-wheel 32 is mounted to revolve in suitable bearings formed at the end of the shifting-lever 33, fulcrumed preferably upon the main frame, as shown in Fig. 1. Therefore the wheel 32 may be termed a "shifting" wheel, and the lever may be operated to carry the shifting wheel into or out of engagement with the driven and driving wheels 30 and 31.

A narrow frame or hanger A² is suspended from and beneath the longitudinal central portion of the main frame A, terminating at a point between the forward and the rear wheels of the vehicle. This hanger-frame usually comprises two parallel and spaced horizontal bars 34, connected at their rear ends with the rear portion of the main frame by uprights 35, and at each side of their centers a like connection is made with the main frame through the medium of uprights 36, and these latter uprights extend downward below the hanger-frame, as is clearly shown in Fig. 1.

Two concentric segmental bars 37 are attached to the lower end of each of the rear uprights 36, it being understood that these uprights are duplicated at each side of the hanger-frame, and the upper ends of the segmental bars are secured to the lower bars 34 of the hanger-frame, forming between them slideways $37^a$, and corresponding segmental bars 38 connect the lower ends of the forward uprights 36 with the forward extremities of the bars 34 of the said hanger-frame, forming slideways $38^a$ intermediate of the running or supporting wheels of the vehicle.

A propelling-wheel 39 is held to turn partially within the hanger-frame $A^2$ at the rear, and the trunnions or shaft $39^a$ of this wheel is journaled in boxes 40, held to slide in the ways $37^a$, and a sprocket-wheel 41 is secured upon one trunnion of one end of the shaft $39^a$, being connected by a link belt 42 with a sprocket-wheel 43, secured upon the driving-shaft 29, and in advance of the propelling-wheel 39 a repelling-wheel 47 is located, the trunnions or shafts 45 whereof are journaled in boxes 44, held to slide in the ways $38^a$, and a trunnion of the repelling-wheel is provided with a sprocket-wheel 46, connected by a link belt $46^a$ with a similar wheel 48, secured on the power-shaft 27, and the boxes 40 and 44 at each side of the running-gear are connected by segmental bars 49, so that when the propelling-wheel is in engagement with the ground the repelling-wheel will be carried out of engagement therewith, and vice versa.

Either the propelling or the repelling wheel may be brought into action by means of a suitable lever, as, for example, a link 50 may be pivotally connected with one of the forward boxes 44, and the said link is pivotally connected to the crank-arm 51, projected from a shaft 52, mounted to rock in the upper or reach frame A' at the rear, and this shaft is provided at one end with a hand-lever 53, which usually extends up at one side of the vehicle-body C when said body is mounted on the running-gear.

A second propelling-wheel 55 is employed beneath the truck B, and this wheel is in alinement with the rear propelling-wheel and the central repelling-wheel. Two segmental bars 54 are secured at their upper ends to each side of the central longitudinal beam of the truck, forming segmental slideways $54^a$, and the lower ends of these bars are supported by suitable braces $54^b$, as shown in Fig. 1. The trunnion 56 of the said wheel 55 is journaled in boxes 57, which have sliding movement in the ways $54^a$. Upon one end of the trunnion 56 a sprocket-gear 58 is secured, corresponding to the gear 41 on the rear propelling-wheel. A yoke 59 is preferably made integral with the boxes 57, and the said yoke is carried over the periphery of the forward driving-wheel 55 to preserve the said wheel against lateral displacement.

The forward driving-wheel is raised or lowered, primarily, through the medium of a link 60, the said link being provided with a lower bow-section $60^a$, whereby it spans the forward wheel and extends from one of its boxes to the other, being pivotally connected therewith. The link is carried upward through the truck and above the reach-frame A', and its upper end is provided with a bifurcated angular section $60^b$, which is slidingly mounted on the king-bolt 15. A curved link 61 is mounted to turn upon the said king-bolt beneath the bifurcated section $60^b$ of the lifting-link 60 and is adapted to raise the latter link, and the rear end of the curved link 61, which is curved in a downwardly direction, is attached to a shaft 62, and the rear end of a second curved link 63 is secured to the same shaft, as illustrated in Figs. 1 and 2, and the forward end of the second curved link 63, which is located near the rear end of the reach-frame A', is pivotally connected to a third curved link 64, and this link extends forwardly to a connection with a shaft 65, journaled in the said reach-frame A' and located between the forward extremity of the link 63 and the rear extremity thereof, as shown particularly in Fig. 1, and the shaft 65 is provided with a hand-lever 66 at one of its ends, whereby it may be rocked, and when the hand-lever 66 is carried in the direction of the arrow shown in Fig. 1, or in direction of the rear of the vehicle, the grouped lever-links 61, 63, and 64 will be manipulated in a manner to cause the forward one 61 to raise the lift-link 60 and carry the forward wheel off from the ground.

The forward and rear wheels 55 and 39 are in engagement with the ground when the vehicle is to be driven ahead, but when the vehicle is to be backed these two propelling-wheels are raised and the repelling-wheel lowered so as to engage with the ground, the repelling-wheel traveling in a direction the reverse of the propelling-wheels. It will be observed that by reason of the segmental guides for the boxes of the propelling and repelling wheels these wheels when forced to an engagement with the ground and set in motion will have a maximum of adhesive strength, since the tendency of the guides or slides for the boxes will be to crowd the wheel downward in the direction in which it is revolved, therefore compelling the wheels of the vehicle to move in the desired direction, and the adhesive force of the wheels will be practically so strong as to virtually cause the vehicle to be lifted upward should any obstacle be in its path, the forward propelling-wheel operating in the direction in which the front axle may be cranked, thus propelling the forward portion of the vehicle in turning around or making curves. The peculiar way in which the propelling and repelling wheels are mounted also serves to cause the wheels to utilize all the power that is imparted to them by the driving mechanism.

The steering of the machine may be accomplished in the following manner: A tubular column 67 is secured upon the forward portion of the main frame A of the running-gear and extends upward through the body of the vehicle convenient to the driver's seat, and is provided with a track 68 at its upper end. A steering-shaft 69 is journaled in this column and extends both above and below it, and at its lower end the steering-shaft is carried through the horizontal yoke 71, secured to the rear central portion of the forward hounds 20, the said yoke being provided with a centrally-located rear extension 71ª, adapted to receive the vertical member of an angular arm 70, secured to the lower end of the said shaft 69. A handle 69ª is preferably hinged to the upper end of the steering-shaft 69, and is provided with a friction-wheel 69ᵇ, adapted to travel on the track 68 of the column in which the said shaft turns. Therefore, by turning the handle 69ª to the right or to the left the carriage may be guided to one side or the other, and the forward truck will be held in its cramped or canted position by exerting downward pressure on the handle, the friction roller or block 69ᵇ acting as the fulcrum of the lever to raise the steering-shaft 69, thus cramping the back of the truck-frame B between the bottom support of the tubular column 67 and a flange 69ᶜ at the bottom of the steering-shaft 69.

The forward driving-wheel 55 is driven from the drive-shaft 29 ordinarily in the following manner: A shaft 72 is journaled in the bracket 72ª or its equivalent, secured upon the upper portion of the rear auxiliary frame a, and the shaft at its lower end is provided with a beveled gear 73, meshing with a like gear secured on the drive-shaft, as shown in dotted lines in Fig. 1. At the upper end of the shaft 72 a sprocket-wheel 75 is secured, and a link belt 76 is passed around this wheel and is carried horizontally to the front of the running-gear and over the lower portion 77 of a double sprocket-wheel held to turn loosely on the king-bolt 15 or other convenient support, a second and shorter link 79 being passed around the upper section 78 of the aforesaid double sprocket and around a sprocket-wheel 80, located at the front central portion of the truck, being secured upon a shaft 81, journaled in a suitable hanger 82, as shown best in Fig. 1, and the shaft 81 is connected with a shaft 84, journaled in the forward frame b of the truck B, as shown in Figs. 2 and 3, the said shaft 81 having a gear connection 83 with the aforesaid line or counter shaft 84. This line or counter shaft 84 has a sprocket-wheel 85 secured thereon, connected by a belt 86 with the driving-sprocket 58 on the forward driving-wheel 55. A friction-wheel 87 is secured at each end of the forward counter-shaft 84, and upon the hub of each forward supporting or carrying wheel 19 a large sprocket-wheel 88 is firmly fastened, and each large sprocket-wheel is connected by a chain belt 89 with a smaller sprocket-wheel 90, secured upon a short shaft 91, one of such shafts being journaled at each end of the truck-frame B. Each shaft 91 is provided at that end which extends within the truck-frame with a friction-wheel 92, and each wheel 92 faces a friction-wheel 87. A shaft 93 is held to slide in each end of the truck-frame b between each pair of friction-wheels 92 and 87, and each sliding shaft carries a friction-pinion 94, and the peripheries of the pinions 94 are in engagement with the opposing faces of the larger friction-wheels 87 and 92. Each sliding shaft is connected by an arm 95 with an upright shaft 96, suitably journaled in a member of the hounds, and an arm 97 is inwardly projected from each shaft 96, and each arm 97 is pivotally attached to one end of a link 98, the links being pivoted to the forward cross-bars 14ª of the reach-frame A'.

The object of the friction-gearing just described and the connection of the same with the forward wheels is to automatically impart a more rapid movement to the off wheel than to the near one in turning a corner, for example. This is demonstrated in Fig. 3, in which it will be observed that at the right-hand side of the vehicle, at which side the wheel must travel the greatest distance in turning when the forward truck is canted or cramped by the steering-gear, the connection between the reach and the friction shifting-pinions 94 will cause the right-hand pinion to take a position near the periphery of the driving friction-wheel 87 at that side of the truck, while the said pinion will engage with the driven friction-wheel 92 at a point near the center of this wheel, and the friction-gearing at the left-hand end of the truck will be in the reverse position, causing the left-hand wheel to turn quite slowly and the right-hand wheel to turn very rapidly. This friction-gear is repeated at the rear of the vehicle, in which friction-wheels 99 are secured upon the ends of the drive-shaft 29, and friction-wheels 100 are mounted on shafts 101, journaled in the ends of the rear auxiliary frame a, and each shaft 101 carries a sprocket-wheel 102, connected by a chain belt 103 with a large sprocket 104, secured on the adjacent rear supporting-wheel 17 of the vehicle, and a sliding shaft 105 is located between each pair of friction-wheels 99 and 100, carrying a friction-pinion 106 for engagement with both wheels of a pair.

Each sliding shaft is connected with an arm 107, the said arms being fulcrumed ordinarily at the forward end portions of the auxiliary frame a, and are each pivotally connected to the rear end of a link 108, the said links being attached to the forward truck, one at each side of its center.

A brake-shaft 109 is journaled in the main frame A, in front of the rear supporting-wheels of the vehicle, and the said brake-shaft is provided with a crank-arm 110 at or near its center, connected by a link 111 with a brake-lever 112, fulcrumed at the forward end of the rear main frame A, and extending preferably upward within the body of the vehicle at a point near the dash. The brake-beam 112ª is suitably connected with the brake-shaft 109, which has a rocking motion, and the brake-beam carries brake-shoes 113 of any approved form, being adapted for engagement with the rear supporting-wheels of the vehicle.

The guides for the driving wheels or gears 39, 47, and 55 are necessarily curved in direction of the rotation of the wheels to accomplish the heretofore-described gripping power of the wheels with the ground, and therefore the guides for the rear propelling-wheel and the repelling-wheel are curved in opposite directions, their concaved faces being made to face each other.

It will be observed that each of the running or supporting wheels, both at the front and at the rear of the vehicle, are utilized as drivers, since the connection between the forward line or driving shaft 84 and the supporting or running wheels of the forward axle, and also the connection between the rear drive-shaft 29 and the supporting or running wheels 17 of the rear axle, is such as to cause these wheels to serve as propellers, independent of the action of the central propelling-wheels 39 and 55, in addition to the said driving mechanism acting to regulate the speed of the outer and inner wheels in turning curves, and consequently in passing over rough ground if one or more of the wheels are not brought in traction engagement with the surface the remaining wheels will still act as drivers.

Hinges 14ᵇ are preferably secured to the forward cross-bar 14ª of the reach-frame A', in order that a hinge connection may be made between the body of the vehicle and the aforesaid bar, enabling the body to be drawn forward by disconnecting its attachments to the rear portion of the main frame or rear axle and permitting any portion of the running-gear to be readily reached for purposes of repair, cleaning, &c.

Having thus described my invention, I claim as new and desire to secure by Letters Patent—

1. In a vehicle, propelling-wheels, segmental guides in which the boxes of the said wheels have movement, the said guides being fixed and curved in direction of the wheels which they govern, a motor, a driving connection between each wheel and the motor, the driving mechanism for one wheel operating in a reverse direction to that of the opposing wheel, and a connection between the two wheels, whereby when one is carried into engagement with the ground the other is removed from engagement therewith, as and for the purpose set forth.

2. In a vehicle, a propelling and a repelling wheel, a mechanism, substantially as described, for operating the wheels in opposite directions, fixed guides curved in direction of the rotation of the wheels, the boxes of the said wheels having movement in the said guides, and a connection between the said boxes, and a shifting device connected with one of the boxes, whereby either the propelling or the repelling wheel may be brought to an engagement with the ground, one ascending as the other descends, as and for the purpose set forth.

3. In a motor-propelled vehicle, supporting or running wheels and propelling-wheels operating independent of the running-wheels, a motor, and a driving connection between the running-wheels and the propelling-wheels, substantially as described.

4. In a vehicle, the combination, with the rear axle and the running-gear attached thereto, and a frame secured to the forward axle, the said axle being pivotally connected with the rear portion of the running-gear, of a yoke attached to the forward frame, a tubular support located upon the rear portion of the running-gear, a shaft held to turn and slide longitudinally within the said support, and provided with an arm extending upward in the said yoke, and a handle pivoted to the said shaft, having a projection capable of frictional engagement with the aforesaid tubular support, as and for the purpose specified.

5. In a vehicle, the combination, with the forward and rear axles, running or supporting wheels loosely mounted thereon, and a running-gear constructed in two sections, one section being connected with the rear and the other with the forward axle, the forward axle having pivotal connection with the rear portion of the running-gear, of a motor, shafts driven from the motor and carried one by the forward portion of the running-gear and the other by the rear portion of the said running-gear, a speed-regulating gearing carried by both sections of the running-gear, the said speed-regulating gears being each set in driving connection with the running-wheels of the vehicle, and a shifting-gear regulating each set of running-gears, and operated by the steering movement of the forward axle, as and for the purpose set forth.

6. In a vehicle, the combination, with the forward axle, a reach connected therewith, a forward axle pivotally connected with the said reach, and a frame supported from the forward axle, and running or supporting wheels loosely mounted on the said axles, of a motor, shafts located one in the forward frame and the other on the reach, being driven from the said motor, speed-regulating gears driven from the said shafts, each speed-regulating gear being in driving connection with a supporting or running wheel, a shifting-gear operating to increase or decrease speed, forming a portion of each set of regulating-gears, shifting-arms connected with the shifting-gears of the forward frame and likewise connected with the said reach, and shifting-arms likewise connected with the shifting-gears in the reach, the said arms being also attached respectively to the forward axle and forward cross-bar, or a support operating in connection therewith, as and for the purpose specified, whereby in turning a corner the outer wheel will be automatically made to travel faster than the inner one, as and for the purpose specified.

7. In a vehicle, the combination, with the running-gear, of a forward and a rear propelling-wheel independent of the supporting or running wheels of the vehicle, and a repelling-wheel located between the propelling-wheels, segmental fixed guides for the said wheels, receiving the boxes thereof, the guides being curved in direction of the rotation of said wheels, a motor, a driving connection between the motor and the said propelling and repelling wheels, the propelling-wheels being driven in a direction the reverse of the repelling-wheel, and shifting devices, substantially as described, whereby either the propelling-wheel or the repelling-wheel may be brought into or carried out of engagement with the ground, the bearing of one of the propelling-wheels being connected with the bearing of the repelling-wheel, as specified.

8. In a traction vehicle, the combination of a motor, two oppositely-driven traction-wheels capable of alternately engaging the ground, carrying-wheels, a shaft geared with each carrying-wheel, a shaft driven from the motor, variable-movement-transmitting mechanism connecting the three shafts, and a cramping-axle by which said movement-transmitting mechanism is controlled, substantially as described.

9. In a traction vehicle, the combination of a motor, two traction-wheels, means for oppositely driving the traction-wheels, two carrying-wheels, a cramping-axle on which the wheels are carried, gearing for independently driving the carrying-wheels from the motor, and means controlled by the cramping-axle for varying the movements imparted to the carrying-wheels, substantially as described.

10. In a traction vehicle having a cramping-axle, the combination of a motor, a traction-wheel driven from the motor, a carrying-wheel geared with the motor, and means for varying the movement applied to the carrying-wheel, said means being controlled by the cramping-axle, substantially as described.

11. In a vehicle, the combination with a frame, of a cramping-truck, a steering-shaft, a crank carried on said shaft and connected to the truck, a sleeve in which the steering-shaft is contained the sleeve having a circular way, and a lever fulcrumed to the steering-shaft and having a fulcrum moving on the way, substantially as described.

12. In a traction vehicle, the combination of a motor, a traction-wheel driven by the motor, a guide in which the traction-wheel is movable, a rod connected to the traction-wheel for moving the same, a shaft, a link fixed to the shaft and connected to the rod, a second link fixed to the shaft, and a lever connected to the free end of the second link, substantially as described.

13. The combination of a cramping-axle, a rotary shaft in connection with and capable of operating the axle, a lever fulcrumed to the shaft and capable of turning and locking the shaft and means on which the lever may bear, substantially as described.

14. In a vehicle, the combination of a motor, two arc-shaped guideways, a traction-wheel movable in each guideway, a rod rigidly connecting the two traction-wheels whereby they are capable of alternate engagement with the ground, gearing for oppositely driving the two traction-wheels, a third rigid guide, a traction-wheel movable in the guide, gearing for driving said traction-wheel, and means for raising and lowering the traction-wheels, substantially as described.

15. In a traction-wheel, the combination of a motor, two traction-wheels, means for rigidly connecting the traction-wheels, gearing for oppositely driving the traction-wheels from the motor, a link connected to one traction-wheel, a shaft to which the link is connected, and a lever connected to the shaft and capable of rocking the same to raise or lower the traction-wheels, substantially as described.

16. In a traction vehicle, the combination of a motor, a traction-wheel driven by the motor, two carrying-wheels, two shafts respectively geared with the carrying-wheels, a shaft driven from the motor, movement-transmitting mechanism connecting the three shafts, a cramping-axle on which the carrying-wheels are held, and a connection between the cramping-axle and the movement-transmitting mechanism, substantially as described.

17. In a traction vehicle, the combination with a frame, of two curved guideways, traction-wheels respectively mounted and movable in said guideways, means for independently raising and lowering the traction-wheels, and gearing by which they may be oppositely driven, substantially as described.

FRANK W. HAVILAND.

Witnesses:
J. FRED. ACKER,
JNO. M. RITTER.